March 27, 1962  H. S. RAINEY  3,026,647
FISHING DEVICE
Filed Feb. 16, 1961

INVENTOR.
HORACE S. RAINEY
BY John R. Walker, III
Attorney

United States Patent Office 3,026,647
Patented Mar. 27, 1962

3,026,647
FISHING DEVICE
Horace S. Rainey, 4674 Quince, Memphis, Tenn.
Filed Feb. 16, 1961, Ser. No. 89,746
1 Claim. (Cl. 43—44.4)

This invention relates to a fishing device or fishhook combined with means for holding the bait adjacent the fishhook in position to facilitate the catching of a fish.

One of the principal objects of the present invention is to provide a fishing device in which live minnows can be used in that type of fishing known as casting without the minnow being injured or thrown off of the device.

A further object is to provide such a fishing device that holds a minnow in such a position that it is free to move around more than in previous devices of this type, and which agitates the minnow into action.

A further object is to provide such a device which holds the minnow in such a manner that it has a much longer life than previous devices of this general type.

A further object is to provide such a device which is so arranged that in most cases a minnow can be used again.

A further object is to provide such a device that will hold various sized minnows.

A further object is to provide such a device that insures that the minnow will not drop off during raising or lowering of the hook out of or into the water, or when moved through the water as when trolling.

A further object is generally to improve the design and construction of fishing devices.

The means by which the foregoing and other objects of the present invention are accomplished and the manner of their accomplishment will be readily understood from the following specification upon reference to the accompanying drawings, in which.

Figure 1:
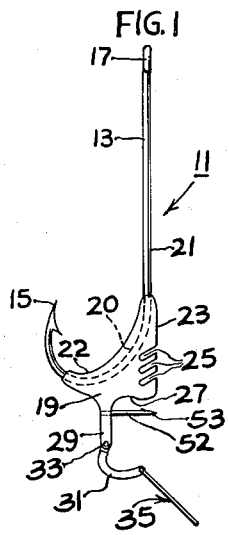
FIG. 1 is a front elevational view of the fishing device of the present invention with the loop being shown in an unlatched position.

Referring now to the drawings in which the various parts are indicated by numerals, the fishing device 11 of the present invention includes the usual fishhook, per se, shown at 13, which fishhook has the usual barbed point 15 adjacent one end and an eyelet 17 at the upper end thereof to which is adapted to be attached the fishing line, not shown, in the usual manner. Fishhook 13 is embedded in an irregularly shaped body portion 19 to fixedly interconnect the fishhook and the body portion. The major part of body portion 19 extends below fishhook 13. Only enough of body portion 19 extends over the arcuate portion 20 of fishhook 13 in order to attach the body portion to the fishhook and to cover a major portion of the arcuate portion 20 leaving the barbed point 15 on the outside of the body portion, as well as the shank 21 of the fishhook. In other words, body portion 19 follows the contour of the fishhook to provide a minor arcuate portion 22 just above the arcuate portion 20.

Body portion 19 is provided with a substantially vertical side 23 which has a plurality of notches 25 that angle downwardly and inwardly into the body portion from vertical side 23. Notches 25 are arranged one above the other in spaced and substantially vertical alignment. Body portion 19 extends substantially horizontally inwardly from vertical side 23 to establish an edge portion 27, which is preferably arcuate in shape to conform to the back of a minnow. Body portion 19 additionally includes a portion 29 depending from edge portion 27 and spaced inwardly from side 23. An arcuate cradle 31 is pivotally attached adjacent one end, by suitable means as a pin 33, to depending portion 29 adjacent the lower end thereof.

A continuous loop 35 is provided, having a pair of spaced legs 37, 39 interconnected by spaced upper and lower ends 41, 43. Loop 35 is pivotally attached to cradle 31 adjacent the opposite end from pin 33, as by lower end 43 rotatably extending through a transverse bore 45 in the cradle.

Figure 2:
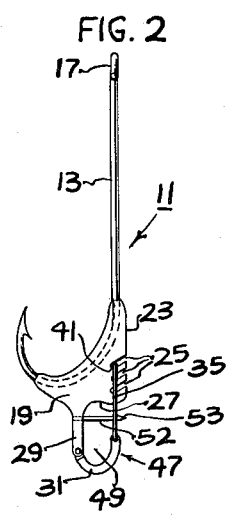
FIG. 2 is a view similar to FIG. 1 but showing the loop in a latched position.
Figure 4:
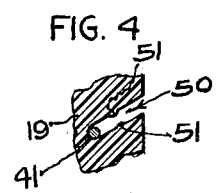
FIG. 4 is an enlarged fragmentary sectional view taken as on the line IV—IV of FIG. 3.
Figure 5:
FIG. 5 is an enlarged elevational view of a portion of the impaling pin.

Fishing device 11 is adapted to be placed in an unlatched position shown in FIG. 1 or a latched position shown in FIG. 2. When in said latched position upper end 41 of loop 35 is engaged in a selected one of notches 25 which establishes a continuous band 47 having a central opening 49 therethrough. It will be understood that band 47 includes depending portion 29 as one side thereof, loop 35 as the opposite side thereof, cradle 31 as the lower part thereof, and edge portion 27 as the upper part thereof. Means are provided for retaining loop 35 in notches 25 against accidental removal therefrom, and preferably include the following: Each of notches 25 are provided with a restricted mouth portion 50 formed by a pair of inwardly extending protrusions 51 spaced apart a distance slightly less than the diameter of upper end 41 so that the loop must be forced by a slight amount of pressure through the mouth portion.

An impaling pin 52 is fixedly mounted in body portion 19 and extends across central opening 49 in spaced relationship beneath edge portion 27. Pin 52 is disposed adjacent the upper portion of central opening 49, i.e., the pin is closer to edge portion 27 than cradle 31 and in a position so that the pin is adapted to pass through the upper portion of the minnow, which will be understood better in the description to follow of the operation of device 11. Impaling pin 52 is pointed adjacent the outer end thereof as at 53, and a barb 55 is provided on pin 52 spaced inwardly from point 53, for a purpose later to be described.

To use the device 11 of the present invention, loop 35 is unlatched by forcing loop 35 past reduced portion 50 and swinging the loop 35 and cradle 31 downwardly to the position shown in FIG. 1 ready to receive a minnow A. Minnow A is placed on impaling pin 52 with the pin extending through the upper portion of the minnow above its spine intermediate the length of the minnow. It will be understood that the impaling pin 52 only passes through the upper part of the minnow above the spine and other vital portions thereof, and does not injure it, so that the minnow will last a long time. The minnow is pushed sufficiently on pin 52 so that the barb 55 extends on the outside of the minnow to hold it thereon so that the minnow cannot escape before the device is latched. Next, loop 35 is placed in a selected one of notches 25 depending upon the size of the minnow. It will be understood that loop 35 should be forced downwardly below restricted portion 50 so that the loop will not become unlatched.

Figure 3:
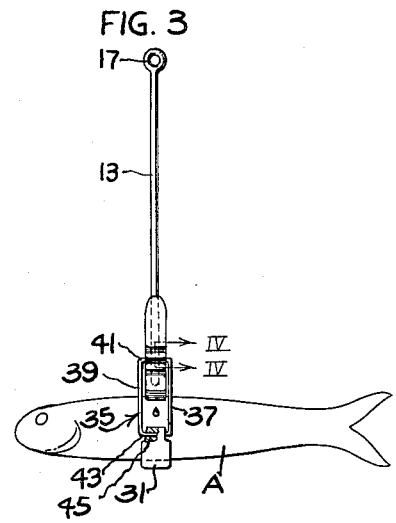
FIG. 3 is a side elevational view of the fishing device of the present invention illustrating a minnow being held in the device, and with a portion of the device being broken away for purposes of illustration.

From the foregoing, it will be understood that the minnow extends substantially perpendicular to the plane of hook 13. This is so since band 47 extends substantially in alignment with the plane of hook 13 and therefore the axis of opening 49 is substantially perpendicular to the plane of the fishhook. Also, it will be seen that band 47 is relatively narrow in thickness, that is, the thickness of the band as shown in FIG. 3 is less than the width of the band as shown in FIG. 2 so that the band only covers a small portion of the minnow adjacent its mid-portion and leaves the major part of the minnow free to move. Also, it will be understood that since the minnow is held around its mid-portion, band 47 agitates the minnow into action so that it swims about to attract fish.

From the foreging it will also be understood that hook 13 is free of the minnow so that when a fish is caught on the hook the minnow can in most cases be used again sinse it will not be torn up by removing the hook from the fish's mouth. Also, body portion 19 and cradle 31 are preferably formed from a clear plastic so that they are substantially invisible in the water, thereby not distracting the fish. In addition, from the foregoing it will be apparent that the minnow is securely held in band 47 without injuring the minnow, and is held in such a manner that the fishing device 11 may be used for casting without the minnow being through off or being pulled apart. In addition, it will be understood that there is no possibility of the minnow dropping off during the raising or lowering of the device in "straight line" fishing.

Although the invention has been described and illustrated with respect to a preferred embodiment thereof, it is to be understood that it is not to be so limited since changes and modifications may be made therein which are within the full intended scope of this invention as hereinafter claimed.

I claim:

A fishing device comprising a body portion, a fishhook having a portion thereof embedded in said body portion to fixedly interconnect said fishhook and said body portion, said body portion being provided with a plurality of notches, said notches being arranged in spaced vertical alignment, said body portion including an edge portion and a depending portion depending from said edge portion, an arcuate cradle pivotally attached adjacent one end to said depending portion, a wire loop having an upper and a lower end, said loop being pivotally attached to said cradle adjacent the lower end of said loop and being removably engaged in a selected one of said notches, each of said notches having a restricted mouth portion to prevent accidental removal of said loop therefrom; said edge portion, said cradle, said depending portion and said loop being ararnged to establish a band having a central opening therethrough whereby said band is adapted to suround and hold the mid-portion of a minnow with the minnow extending through said opening, said band being disposed beneath said hook in substantially parallel relationship with the plane of said hok whereby a minnow held in said band is adapted to extend substantially perpendicular to the plane of said hook and therebelow, an impaling pin fixedly mounted in said body portion and extending across said opening towards said loop in spaced relationship adjacent said edge portion whereby said pin is adapted to extend through the upper part of the body of a minnow to prevent the minnow from swiimming out of said band, said loop being movable by force past said restricted mouth portion to unlatch said loop for removing the minnow, said pin being provided with a barb adjacent the outer end thereof whereby said minnow is prevented from accidentally leaving said pin when said loop is unlatched.

References Cited in the file of this patent

UNITED STATES PATENTS

| 2,588,526 | Hoage | Mar. 11, 1952 |
| 2,616,207 | Shadley et al. | Nov. 4, 1952 |
| 2,741,060 | Rowlance | Apr. 10, 1956 |
| 2,782,550 | Bretl | Feb. 26, 1957 |
| 2,791,861 | Beck | May 4, 1957 |

FOREIGN PATENTS

| 20,753 | Sweden | Mar. 3, 1904 |